Sept. 29, 1964   H. BECKER ETAL   3,150,680
HOT-GAS VALVE

Filed May 18, 1962   4 Sheets-Sheet 1

Helmut Becker
Herbert Hickmann
INVENTORS.

BY Karl F. Ross

AGENT

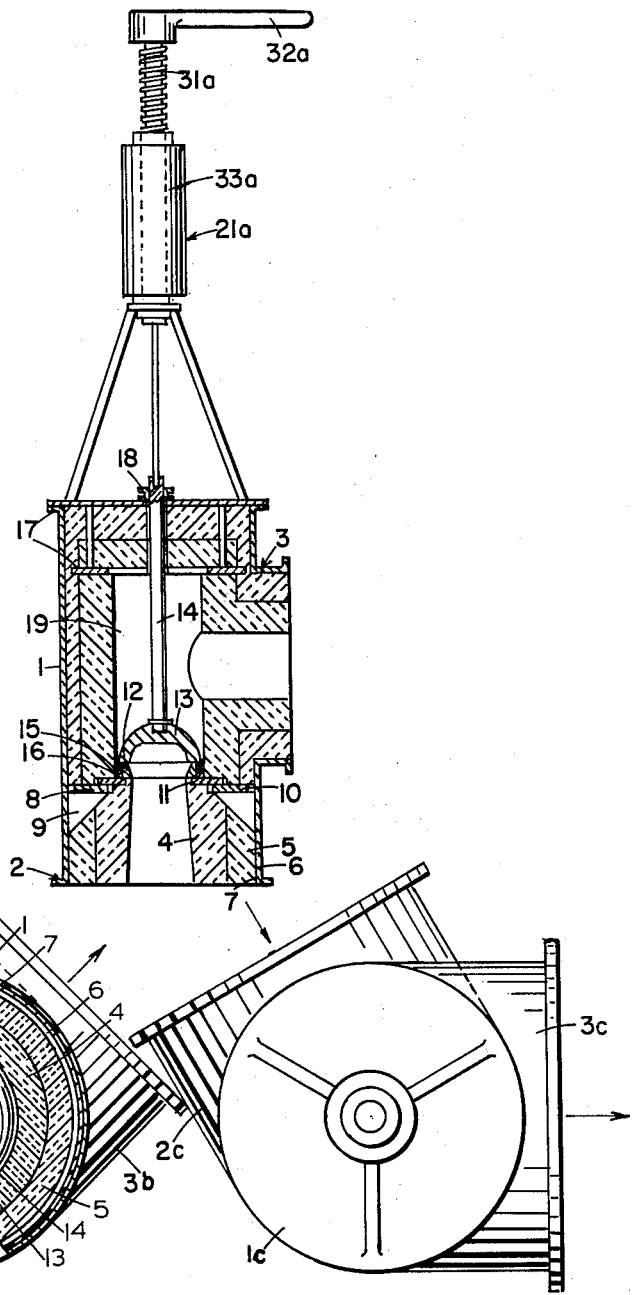

United States Patent Office 3,150,680
Patented Sept. 29, 1964

3,150,680
HOT-GAS VALVE
Helmut Becker and Herbert Hickmann, Oberhausen, Germany, assignors to Huttenwerk Oberhausen A.G., Oberhausen, Rhineland, Germany, a company of Germany
Filed May 18, 1962, Ser. No. 195,829
Claims priority, application Germany May 20, 1961
10 Claims. (Cl. 137—375)

Our present invention relates to a valve for controlling the flow of hot gases and, more particularly, to a hot-gas valve capable of operating at temperatures in excess of about 1200° C. without requiring the use of a cooling fluid.

It is known to provide valves for the control of hot gases wherein a valve member is seated against comminuted heat-resisting material to form a seal. Such valves, however, while being able to withstand the high temperatures referred to above, were unsatisfactory for use with gases at high pressures since the comminuted material was often carried off by such gases. The provision of valve seats rigid with the valve housing in order to avoid the disadvantages of such valves was unsatisfactory inasmuch as the rigid valve seats often warped as a result of the high temperatures employed.

It is an object of the present invention, therefore, to provide a hot-gas valve capable of withstanding high temperatures and pressures while being designed to avoid the foregoing disadvantages.

A further object of the invention is to provide a valve for the control of the flow of high-temperature gases without substantial loss of heat therefrom.

These objects have been realized, according to the invention, in a valve comprising a preferably refractory body formed with an elongated chamber provided with a rigid valve seat loosely positioned therein and a valve member engageable with the seat along an annular sealing surface. The valve member is provided with a further sealing surface, advantageously outwardly of the first sealng surface, adapted to extend into a mass of comminuted heat-resistant material such as sand, fibers (e.g. asbestos or noninflammable textile fibers) or the like. The valve member may be generally bell-shaped so that the first sealing surface is annular in form and juxtaposed with an annular surface of the seat-forming member which may be a ring loosely positioned in the chamber. The ring preferably is positioned therein with peripheral clearance so as to form an annular compartment containing the comminuted sealing material while the valve member has its second annular surface extending axially beyond the first annular surface into this compartment to be partially imbedded in the sand or fibers and to form a labyrinth seal outwardly of the first sealing surface.

The valve chamber is, advantageously, generally cylindrical and has a substantially vertical axis along which the valve member is displaceable by control means operable externally of the valve body while the seat-forming member rests upon a support extending outwardly from the wall of the valve body. According to a more particular feature of the invention, the support is a further ring, loosely imbedded in the refractory body so as to prevent warping, which extends transversely to the vertical axis. The valve body preferably comprises a shell of heat-resistant steel (e.g. a high-silicon steel) which forms with a porous outer refractory lining a dead-air space for reducing conductive losses of heat from the valve. An inner refractory lining, somewhat less porous than the outer lining whose pores also form dead-air spaces preventing conductive and/or convective losses of heat, encloses the valve chamber. The valve-control means comprises a stem extending axially within the chamber upon which the valve member is rotatably mounted. The stem may be displaced axially by electromagnetic (e.g. a motor or solenoid), hydraulic or pneumatic means or manually.

A further feature of the invention resides in the provision of a spacing ring interposed between the seat-forming member and the wall of the chamber to maintain the annular compartment for the comminuted sealing material, the spacing ring being carried by the supporting means for the seat-forming member and, advantageously, being of smaller axial dimension. The spacing ring is, of course, loosely carried by the support. While the bell-shaped valve member and the seat-forming member are both of rigid construction and may be made from refractory material and/or heat-resistant steel, we have found it advantageous to provide one or both of these members with a deformable annular seal of asbestos and the like with or without admixtures such as brass or graphite.

According to another aspect of the invention the first sealing surface may be formed by a relatively massive valve member while the second sealing surface is formed by a shell-like member outwardly thereof and freely movable in axial direction relatively to the first valve member. The advantage of this construction is that the first valve member may achieve a purchase on the seat-forming member with a resulting sealing owing to its mass without being restrained upon the engagement of the second valve member wth the comminuted sealing material. It should be noted that the heat-resistant steel to be employed in this valve should be able to withstand the corrosive effects of the gases flowing through the valve and may be, to this end, a stainless or semistainless steel.

The above and other objects, features and advantages of the invention will become more fully apparent in the following description, reference being made to the accompanying drawing in which:

FIG. 5 is a view similar to FIG. 1 showing still a further embodiment;

FIG. 6 is a transverse cross-sectional view through a modification of a valve generally similar to the valve shown in FIGS. 1 and 2;

FIG. 7 is a plan view of still another valve modification; and

Figure 1:
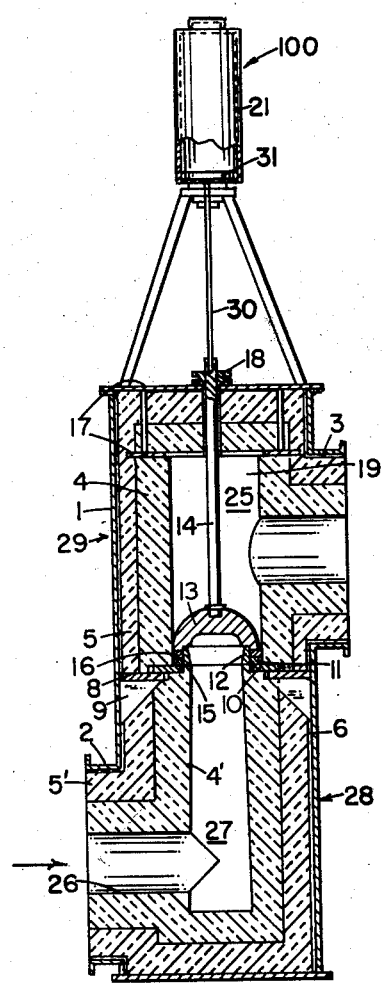
FIG. 1 is a longitudinal cross-sectional view of a hot-gas valve according to the invention, showing the closed position thereof.
Figure 2:
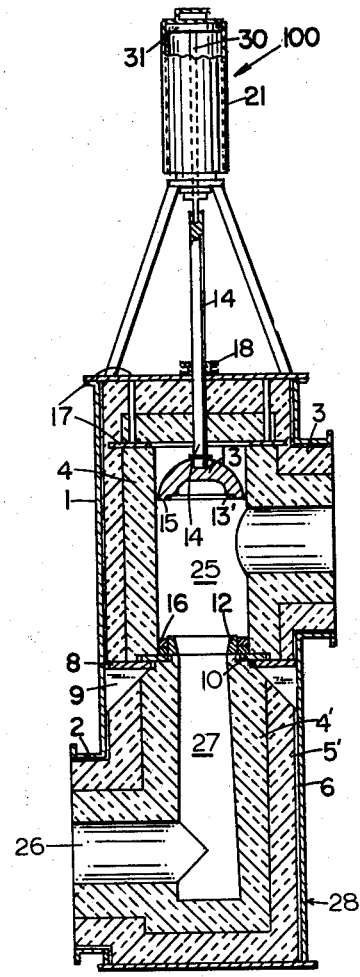
FIG. 2 is a view similar to FIG. 1 showing the valve in its open position.
Figure 3:
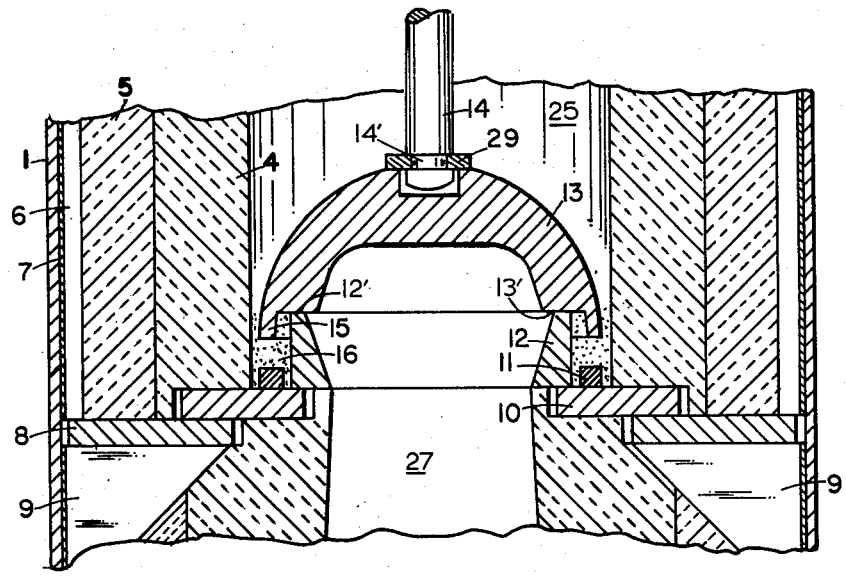
FIG. 3 is a cross-sectional view, drawn to enlarged scale, showing a detail of the valve of FIGS. 1 and 2.

In FIGS. 1–3 of the drawing we show a valve 100 comprising a shell 1 of heat-resistant steel which encloses the valve body. Spaced from the shell 1 with a peripheral clearance 6, forming a dead-air space, is an outer insulating lining 5 of porous refractory material and an inner insulating lining 4 of dense refractory material. The shell 1 is also lined along its inner surface with aluminum foil 7 which reflects inwardly any heat radiated toward this shell from within the valve body. While refractory layer 4 forms a substantially gas-impermeable and heat-resistant wall of a vertical chamber 25, the layer 5 with its closed pores prevents conductive transmission of heat from the layer 4 to the shell 1 while also limiting any convection currents which might otherwise result in high heat losses. The dead-air space 6 likewise prevents conductive heat transmission and is, advantageously, of limited width so as to impede the formation of convection currents in this clearance. The width of the dead-air space 6 should, however, be so chosen as to prevent the filling of the space upon thermal expansion of the layers 4 and 5. A plurality of angularly spaced, inwardly projecting support members 9 of triangular configuration are rigidly secured to the shell 1 (e.g. by welding) and have supporting surfaces extending transversely to the vertical axis of the valve body. An annular bearing plate 8, whose diameter is slightly less than that of the shell 1, rests upon the supports 9 with clearance from the shell to permit expansion and contraction without warping. The bearing plate, which may be made from heat-resistant steel as previously described, is also spaced outwardly from the inner lining 4' of the lower portion 28 of valve 100. This lower portion is further formed with an outer porous layer 5' of refractory material and provided with the dead-air space 6 and aluminum foil 7 previously described. An inlet 26 for the heat-reducing gases extends radially into the lower portion 28 of the valve body where it joins with a vertical conduit 27 which converges toward the valve seat. The latter is formed by an annular member 12 which rests upon a support ring 10 imbedded in the refractory layers 4, 4', support ring 10 being, in turn, loosely positioned upon the bearing ring 8. The seating surface 12' of the seat-forming member 12 extends transversely to the vertical axis of the valve body and is juxtaposed with a recessed surface 13' of a valve member 13.

Valve member 13 is carried by a stem 14 which is formed with an annular groove 14' receiving an annular disc 29 rigid with the valve member so that the latter is rotatable relatively to the stem. An annular downward projection 15 extends axially below the sealing surface 13' of valve member 13 and is dimensioned to enter an annular compartment 16 between the seat-forming member 12 and the wall of chamber 25. The compartment 16 is maintained by spacer 11 which is loosely interposed between the seat-forming member 12 and the chamber wall or may be secured to the seat-forming member 12. This compartment is occupied by comminuted heat-resistant material such as sand or other pulverulent mineral, refractory textile fibers, or the like. In general, for use at low gas-flow rates the sealing compartment 16 will be filled with loosely coherent or non-coherent mineral particles while for high gas-flow velocities, in order to prevent the mass of refractory material within the compartment from flowing away, the mass is preferably composed of coherent or intertwined fibers of refractory material; in either case gas leakage is substantially avoided.

The valve member 12, spacer 11 and support ring 10 may, like bearing ring 8, be constructed of a heat-resistant steel having a high degree of resistance to chemical corrosion by the hot gas passing through the valve. The valve stem 14 is then composed of similar material and extends through a bushing 18 in the cover 17 of the valve. A connecting rod 30 joins valve stem 14 with the control device 21. The latter may be a hydraulic or pneumatic cylinder whose piston 31 is secured to connecting rod 30. Alternatively, as shown in FIG. 5, the control device 21a comprises a screw 31a whose crank 32a is rotatable to raise and lower the screw within a fixed threaded bushing 33a. Other mechanical or automatic (e.g. electrical) control means may, of course, also be employed.

Figure 4:
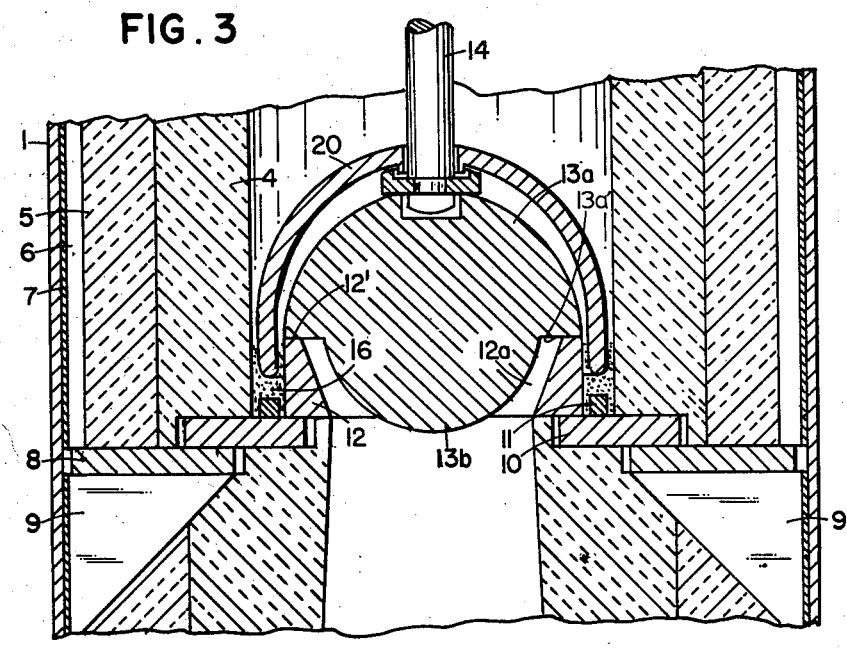
FIG. 4 is a view similar to FIG. 3 of a valve according to another embodiment of the invention.

In FIG. 4 we show an arrangement wherein the valve means comprises an inner, relatively massive member 13a which is formed with a first sealing surface 13a' engageable with the seat 12' of the seat-forming member 12 as previously described. The inner member 13a has a convex portion 13b converging toward the vertical axis of the valve and extending into the seat-forming member 12. While this portion of the valve member has been shown to be of generally hemispherical configuration in FIG. 4, it should be noted that a generally conical shape will serve as well to provide an annular clearance 12a between portion 13b and member 12. Valve member 13a is constructed with a generally ball-shaped body since this configuration is not readily susceptible to distortion due to thermal effects. While member 13a is entrained by the valve stem 14, a bell-shaped second valve member 20 is also carried thereby but is freely displaceable axially thereon. The weight of valve member 20 causes the introduction of its lower portion, which will usually extend axially beyond the first sealing surface 13a', into the refractory mass within compartment 16. Thus, the projecting portion of the valve member 20 constitutes the second sealing surface of a labyrinth preventing the passage of gases from the inlet to the outlet. Since valve member 20 is freely displaceable on stem 14, its engagement with the mass of material in chamber 16 does not prevent valve member 13a from seating firmly against member 12. It is, however, possible to interconnect the two valve members if such a construction is more desirable for a particular application. A labyrinth seal may also be provided between the valve members 13a, 20 and the stem 14.

Upon closure of the valves shown in FIGS. 1–4 by operation of the control device 21 so that valve members 13 or 13a, 20 are disposed in their positions shown in FIGS. 1 and 4, the projection 15 of valve member 13 and the bell 20 of the valve means of FIG. 4 extend into the masses of heat-resistant sealing material contained within the respective compartments 16 while the first sealing surfaces 13a, 13a' of the respective members rest upon the seating surfaces 12' formed by members 12 to prevent the passage of gas through the chamber 25. When the valve is opened to the position shown in FIG. 2, it encloses with the wall of chamber 25 and the removable cover 17 an air cushion 19 which is substantially cooler than the gases passing through the now open valve and thus cools the valve member.

In FIGS. 1 and 2 the inlet and outlet to the valve are shown to extend generally radially so that, upon passage therethrough, the gas continues substantially in its original direction of flow. In FIG. 5, however, we show a so-called corner valve wherein the gas is deflected at a right angle from its vertical inlet 2 to its horizontal outlet 3. In FIGS. 6 and 7 the horizontal inlets 2b and 2c are shown to be at right angles to the horizontal outlets 3b and 3c which include angles of 90° and about 120°, respectively. FIGS. 6 and 7 are illustrative of the fact that the radial inlets and outlets can include substantially any desired angle with each other inasmuch as they lie in different horizontal planes.

The valve described in the foregoing has been found to be of particular value when used with dust- and/or soot-containing gases whereby contamination of the rigid seating surfaces 12', 13' may occur. Thus, any leakage past these sealing surfaces is intercepted by the mass of material in the annular compartment or groove 16.

Figure 8:
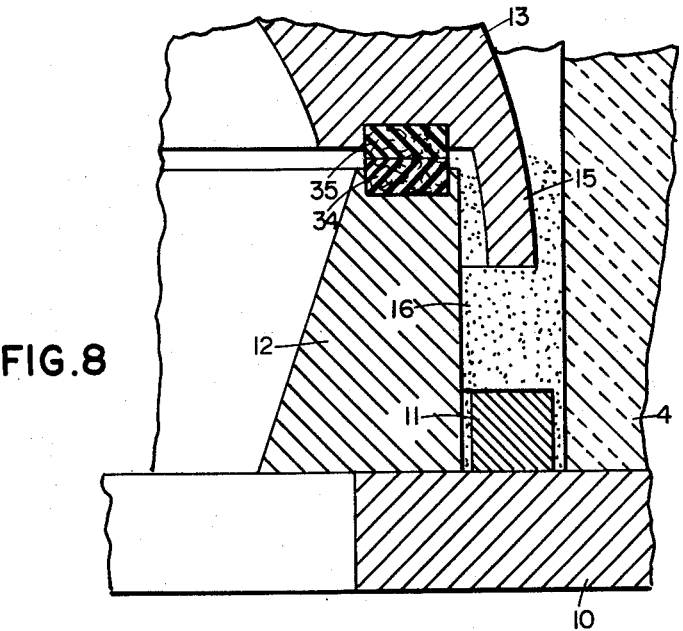
FIGS. 8 and 9 are enlarged detail views showing the seating surfaces of further modifications of the valves illustrated in FIGS. 3 and 4, respectively.
Figure 9:
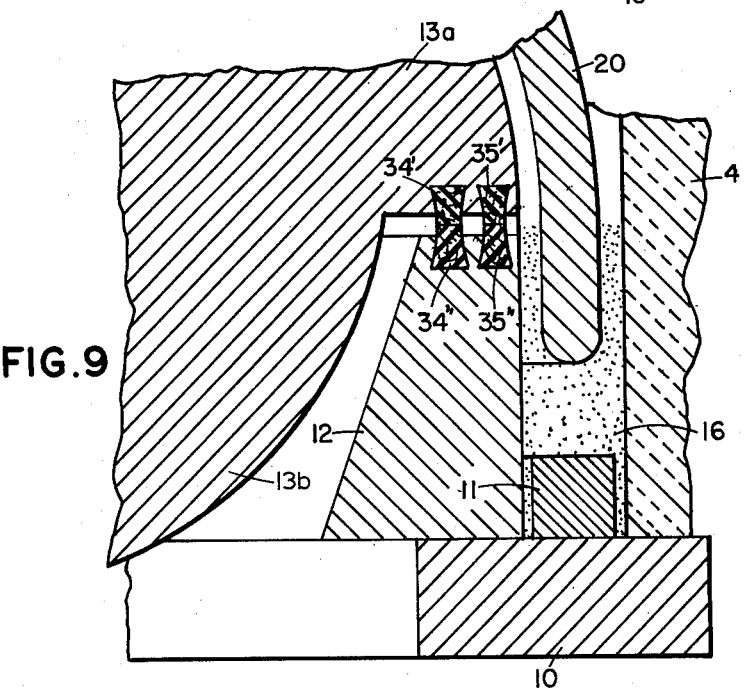

For gases free from soot and the like, resiliently deformable gaskets 34, 35 are provided (FIG. 8) further to guarantee an absolute sealing of the valve. In FIG. 9, two concentric and radially spaced sets of gaskets 34', 35', 34'', 35'' are shown to be provided. This arrangement increases the effectiveness of the labyrinth seal. The gaskets are generally heat-resistant and received in respective grooves within the seat-forming member 12 and valve members 13, 13a. Preferably, these gaskets are composed of ordinary asbestos, brass-coated asbestos, graphite-impregnated asbestos and the like.

In general it will be advantageous to arrange the valve so that the valve member is in its closed condition in the lowermost position of valve members 13, 13a because in this position the load on bushing 18 is at a minimum, owing to the supporting of the valve member by the seat.

The invention as described and illustrated is believed to admit of many modifications and variations within the ability of persons skilled in the art, all such modifications

We claim:
1. In a valve for regulating the flow of hot gases, in combination, a valve body formed with an elongated inner chamber having a substantially vertical axis, inlet means and outlet means respectively communicating with said chamber at axially spaced locations; an annular seat-forming member loosely disposed in said chamber intermediate said inlet and outlet means and provided with an annular valve seat lying in a substantially horizontal plane, said seat-forming member resting upon said valve body with freedom of movement thereon; valve means vertically displaceable within said chamber, said valve means being formed with an annular first sealing surface juxtaposed with said seat and engageable therewith upon displacement of said valve means into a closed position and a second sealing surface substantially concentric with said first sealing surface and outwardly thereof, said seat-forming member being spaced from the wall of said chamber to form an annular compartment surrounding said seat for a mass of heat-resistant material, said second surface extending into said compartment and said mass in said closed position of said valve means; and control means operable for displacing said valve means between said closed position and an open position wherein said first and second sealing surfaces are withdrawn from engagement with said seat and said mass, respectively.

2. The combination according to claim 1 wherein said valve body is provided with inwardly extending support means disposed about said axis, said seat-forming member resting loosely upon said support means, said support means includes a ring surrounding said axis, and a plurality of radially extending angularly spaced supports rigid with said body loosely carrying said ring.

3. The combination according to claim 2 wherein said valve body comprises a steel casing and a refractory lining therefor, said supports being rigidly secured to said casing, said ring being at least partly surrounded by said refractory lining.

4. The combination according to claim 3 wherein said refractory lining comprises an inner layer of relatively dense refractory material forming the wall of said chamber and an outer layer of porous refractory material limiting conductive and convective heat transfer from said inner layer to said casing, said lining being spaced therefrom with peripheral clearance to form a dead-air space further reducing the conductive transfer of heat.

5. The combination according to claim 1 wherein said control means includes a valve stem axially extending into said chamber, said valve means being mounted on said stem with a labyrinth seal, said valve means comprising a massive generally domed valve member formed with at least said first sealing surface.

6. The combination according to claim 5 wherein said valve means includes an inner, relatively massive valve member formed with said first seating surface, a bell-shaped valve member partly enveloping said inner valve member while being displaceable relatively thereto on said stem and being formed with said second sealing surface, and a labyrinth seal interconnecting said valve members at said stem.

7. The combination according to claim 1 wherein said second sealing surface lies axially in the direction of displacement of said valve means toward said closed position forwardly of said first sealing surface, thereby forming together with said first sealing surface a labyrinth seal.

8. The combination according to claim 1, further comprising a spacing ring loosely disposed in said compartment for maintaining the spacing between said seat-forming member and said wall.

9. The combination according to claim 1, further comprising gasket means interposed between said first sealing surface and said valve seat.

10. The combination according to claim 9 wherein said gasket means includes at least one sealing ring of resiliently deformable heat-resistant material received in said seat-forming member and at least one sealing ring of like material received in said valve means.

References Cited in the file of this patent

UNITED STATES PATENTS

| | | |
|---|---|---|
| 913,899 | Joseph | Mar. 2, 1909 |
| 2,001,040 | Sweeney | May 14, 1935 |
| 3,044,499 | Frerich | July 17, 1962 |

FOREIGN PATENTS

| | | |
|---|---|---|
| 627,735 | Germany | Mar. 21, 1936 |
| 567,307 | Great Britain | Feb. 7, 1945 |